No. 802,298. PATENTED OCT. 17, 1905.
S. D. LAUFFER & J. K. GALLAGHER.
AXLE OR WHEEL OILER.
APPLICATION FILED NOV. 22, 1904.
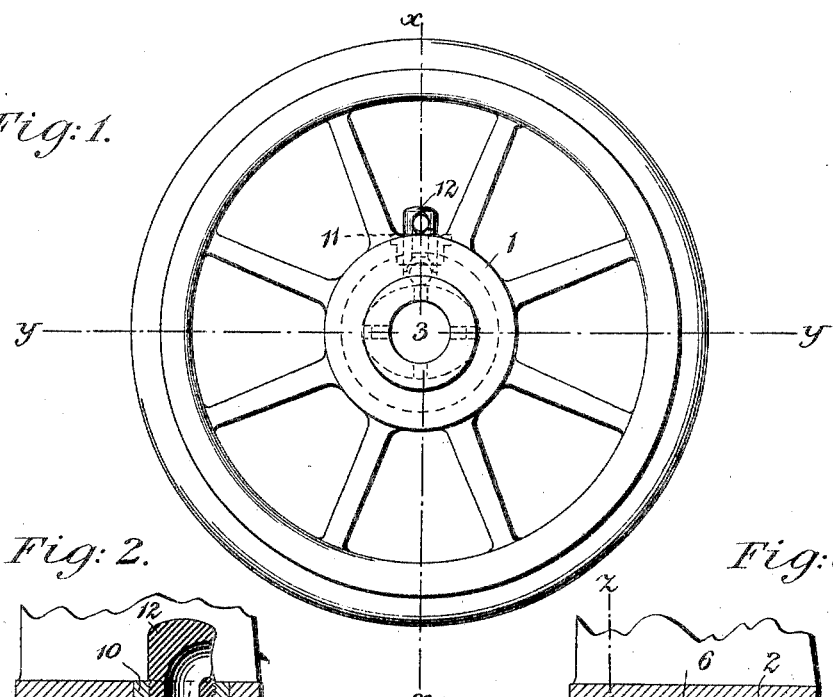
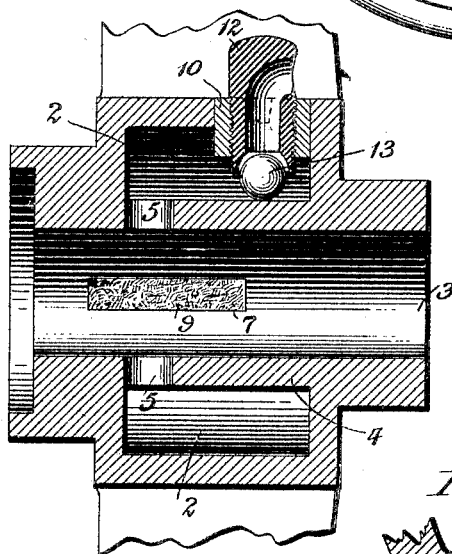
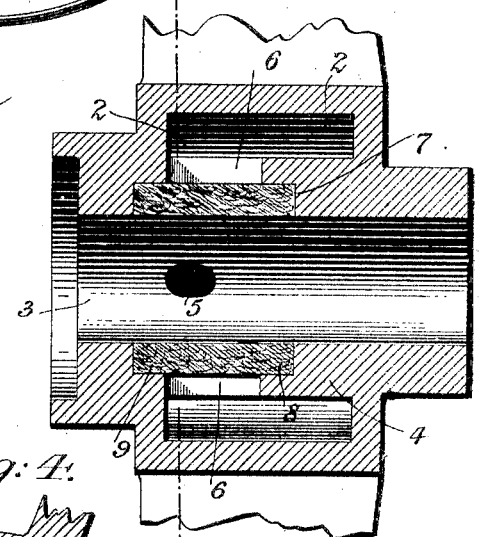
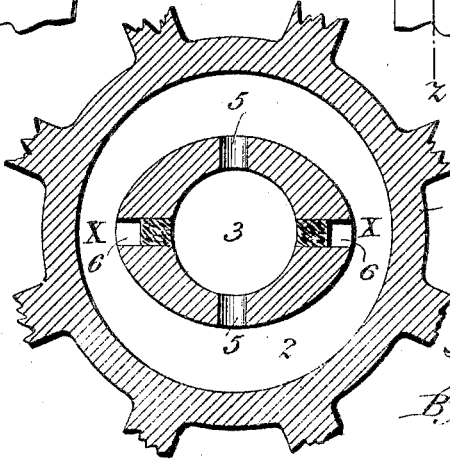
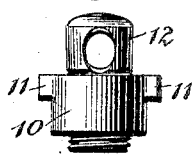
Witnesses:
May E. Moore,
B. C. Ruck.
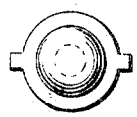
Inventors:
Simon D. Lauffer
and
James K. Gallagher
By David E. Moore
their Attorney

UNITED STATES PATENT OFFICE.

SIMON D. LAUFFER AND JAMES K. GALLAGHER, OF IRWIN, PENNSYLVANIA.

AXLE OR WHEEL OILER.

No. 802,298.  Specification of Letters Patent.  Patented Oct. 17, 1905.

Application filed November 22, 1904. Serial No. 233,809.

*To all whom it may concern:*

Be it known that we, SIMON D. LAUFFER and JAMES K. GALLAGHER, citizens of the United States, residing at Irwin, in the county of Westmoreland and State of Pennsylvania, have invented a new and useful Improvement in Axle or Wheel Oilers, of which the following is a specification.

Our invention relates to axle or wheel oilers, and is primarily intended for use in connection with the wheels of mine or pit cars, although it may be advantageously used to oil other and various kinds of wheels, our principal object being to produce in a simple and inexpensive manner an oiler which may be conveniently applied to and used in connection with the hubs of such wheels and one which can readily be charged with the lubricant.

A further object of our invention is to provide means whereby the oil or lubricant is evenly distributed over and around the axle and whereby the charging-opening for the oil or lubricant will be automatically closed during the rotation of the wheels or at such time or times as said charging-opening may be in an inverted or approximately inverted position, thereby preventing waste or leakage.

The object of having the inner wall of the oil-chamber elliptical or approximately elliptical is to provide a means whereby the oil as the wheel rotates is churned or thrown so as to properly enter the opening through the hub to the journal or axle. If the inner walls were perfectly circular, as generally the case, the oil will rest at the lowest point in the chamber and the wheel would rotate therearound without churning or mixing the oil, as in the case of elliptical or approximately elliptical chamber.

Our invention comprises the novel features of construction and arrangement of parts, all of which will be hereinafter more fully described, and particularly pointed out in the appended claims. To more fully comprehend the nature of our invention, however, and the manner in which the same is or may be carried into effect, reference must be had to the accompanying drawings, forming part of this specification, whereon similar reference-numerals indicate corresponding parts in all the figures, and wherein—

Figure 1 is an elevation of a wheel constructed according to our invention. Figs. 2 and 3 are axial sections thereof, taken, respectively, on the lines $x\,x$ and $y\,y$. Fig. 4 is a transverse section taken on the line $z\,z$ of Fig. 3. Fig. 5 is an elevation of those parts which comprise the charging-opening removed from the hub. Fig. 6 is a plan view thereof.

We will now proceed to describe our invention in connection with said drawings, premising that practical means are there shown for carrying the same into successful operation, and will then point out the novel features in the claims, it being understood, however, in setting forth the several details thereof that we do not limit ourselves to their precise construction, as they may be amplified, modified, and otherwise changed without departing from the spirit or sacrificing any of the advantages of our invention.

Referring to said drawings, 1 indicates the hub of the wheel, the spokes of which are made integral therewith and with the rim or tread of the wheel in the usual manner.

2 indicates an oil-chamber which surrounds the bore 3 in the hub and is separated therefrom by the wall 4, the latter being preferably, but not necessarily, elliptical or approximately elliptical in contour and in which are provided a plurality of openings 5 and 6, the former being located at the thinnest portion of the wall 4, while the latter are located at the thickest portion thereof. (Shown in Figs. 3 and 4.) It will be observed by reference to Fig. 3 that the openings 6 are extended at each end, so as to form appropriate pockets 7 and 8 to receive fillings 9, the latter being composed of hair, felt, waste, or other analogous absorbent material through which the oil from the chamber 2 will be forced during the rotation of the wheel, as it will be apparent that as the latter revolves the oil will be forced from the wider portions of the chamber to the contracted portions thereof, as represented at X, Fig. 4, exerting a force thereon that will cause it to penetrate said absorbent filling, and the latter will in turn serve to evenly distribute it over and around the axle.

At a point axially disposed with relation to the openings 5 and preferably between two of the spokes we provide an opening to receive therein a bushing 10, which is preferably placed in position in said opening at the time and during the process of casting the wheel, and, as will be observed in Figs. 1, 5, and 6, this bushing is provided with teats or lugs 11, which project sufficiently beyond the outer face thereof as to lie under two of the spokes, as clearly shown in Fig. 1, and this construction serves to prevent all possible chance of the bushing becoming displaced. The bushing is internally threaded to receive the threaded end of a short hollow plug 12, which forms the charging-opening for the oil-chamber 2, and at the lower end of this plug a valve-seat is formed for a valve 13, which latter is preferably spherical in form, as shown. When in position, the hollow plug 12 will be retained in such position that its lower extremity will not quite reach the wall 4, and we preferably provide a semispherical enlargement thereat to form a seat for a ball, which forms a closure for said charging-opening. This arrangement permits of a limited movement of the ball, so that when the hub is in the position shown in Figs. 1 and 2 the ball will leave its seat and rest upon the wall 4, leaving a passage for the oil to pass into the chamber 2; but if the parts are in the reverse or inverted position it will be apparent that the ball will seat itself within the semispherical cavity, and thereby effectively close the passage and prevent the escaping or waste of the oil. Obviously also when the wheel is in rapid rotation the centrifugal force will keep the ball upon its seat, and thereby prevent the oil from escaping. The oil from the chamber will pass through the openings 5, as well as being absorbed and forced through the absorbent fillings 9, and if an excess of oil should pass to the axle it is apparent that said fillings will not only absorb it, but will also serve to evenly distribute it over and around the axle.

From the foregoing, taken in connection with the drawings, it will be apparent that our invention provides in a simple and inexpensive manner an oiler for mine or pit car-wheels that is particularly well adapted for the purposes intended and by the use of which the oil will be effectively and economically served to the axle.

Having thus described our invention, what we claim, and desire to secure by Letters Patent, is as follows:

1. A wheel, comprising a body having a peripheral rim and a central hub, the said wheel having in its hub an oil-chamber, the inner wall of which is elliptical in shape, and having a plurality of openings therein leading to the bore of the hub, absorbent fillings, arranged within one or more of said openings, a charging-opening leading from the exterior of the hub into said oil-chamber, and a closure for said charging-opening whereby the latter is closed by centrifugal force during the rotation of the wheel, and whereby, also, said charging-opening is automatically closed when it is in an inverted, or practically inverted, position.

2. A wheel, comprising a body having a peripheral rim and a central hub, the said wheel having in its hub an oil-chamber, the inner wall of which is elliptical in shape, and having a plurality of openings therein leading to the bore of the hub, absorbent fillings, arranged within one or more of said openings, a charging-opening leading from the exterior of the hub into said oil-chamber, a valve-seat, formed at the end of said charging-opening, and a valve adapted to automatically seat itself during the rotation of the wheel, whereby said charging-opening is closed.

3. A wheel, comprising a body having a peripheral rim and a central hub, the said wheel having in its hub an oil-chamber, the inner wall of which is elliptical in shape, and having a plurality of openings therein leading to the bore of the hub, absorbent fillings, arranged within one or more of said openings, a charging-opening leading from the exterior of the hub into said oil-chamber, a semispherical valve-seat, formed at the end of said charging-opening, and a spherical valve adapted to automatically seat itself within said valve-seat, whereby said charging-opening is closed.

In testimony whereof we have signed our names to this specification in the presence of two subscribing witnesses.

SIMON D. LAUFFER.
JAMES K. GALLAGHER.

Witnesses:
S. D. HAMILTON,
C. B. FRITCHMAN.